(12) United States Patent
Bowyer et al.

(10) Patent No.: US 9,308,895 B2
(45) Date of Patent: Apr. 12, 2016

(54) AXLE HUB ASSEMBLY

(71) Applicant: SAF-HOLLAND, Inc., Holland, MI (US)

(72) Inventors: John Bowyer, Whitehall, MI (US); Edward Hammer, Muskegon, MI (US)

(73) Assignee: SAF-HOLLAND, Inc., Holland, MI (US)

( * ) Notice: Subject to any disclaimer, the term of this patent is extended or adjusted under 35 U.S.C. 154(b) by 75 days.

(21) Appl. No.: 14/195,012

(22) Filed: Mar. 3, 2014

(65) Prior Publication Data

US 2014/0319900 A1 Oct. 30, 2014

Related U.S. Application Data

(60) Provisional application No. 61/815,494, filed on Apr. 24, 2013.

(51) Int. Cl.

| | |
|---|---|
| *B60T 1/06* | (2006.01) |
| *F16D 51/20* | (2006.01) |
| *F16D 55/00* | (2006.01) |
| *F16D 65/00* | (2006.01) |
| *F16D 65/12* | (2006.01) |
| *B60B 11/02* | (2006.01) |
| *B60B 27/00* | (2006.01) |

(Continued)

(52) U.S. Cl.
CPC . *B60T 1/06* (2013.01); *B60B 11/02* (2013.01); *B60B 27/0052* (2013.01); *B60B 27/0057* (2013.01); *B60B 35/04* (2013.01); *F16D 51/20* (2013.01); *F16D 55/00* (2013.01); *F16D 65/0056* (2013.01); *F16D 65/0062* (2013.01); *F16D 65/12* (2013.01); *B60B 2900/351* (2013.01); *F16D 2051/003* (2013.01); *F16D 2055/0008* (2013.01); *F16D 2055/0012* (2013.01)

(58) Field of Classification Search
CPC .................. B60B 27/0052; B60B 27/0057
USPC .......................................... 188/17, 18 R, 18 A
See application file for complete search history.

(56) References Cited

U.S. PATENT DOCUMENTS 4,102,443 A 7/1978 Kohler et al.
4,784,241 A * 11/1988 Temple .................. B60T 1/065
188/70 R (Continued)

OTHER PUBLICATIONS

Webb Wheel Products, Inc., Hub Products Catalog, First Page.

(Continued)

*Primary Examiner* — Jeffrey J Restifo
*Assistant Examiner* — Erez Gurari
(74) *Attorney, Agent, or Firm* — Price Heneveld LLP

(57) ABSTRACT

An axle assembly includes an elongated axle body, axle spindles coupled to ends of the axle body, and axle hub assemblies each comprising a hub housing having an interior space that receives one of the spindles therein, the hub housing including a radially extending drum brake mounting flange adapted to have a brake drum assembly mounted thereto, and a disc brake mounting portion separate from the drum mounting flange and adapted to have a disc brake assembly mounted thereto, and a first bearing assembly rotationally supporting the first hub housing from the first axle spindle, whereby the brake drum assembly and the disc brake assembly may alternatively be mounted to the drum brake mounting flange and the disc brake mounting portion of the hub housing, respectively.

20 Claims, 4 Drawing Sheets

(51) Int. Cl.
  *B60B 35/04* (2006.01)
  *F16D 51/00* (2006.01)

(56) References Cited

U.S. PATENT DOCUMENTS

| | | | | |
|---|---|---|---|---|
| 4,995,481 A | * | 2/1991 | Temple | B60T 1/065 188/18 A |
| 5,865,275 A | * | 2/1999 | Anger | F16D 63/004 164/98 |
| 5,988,761 A | | 11/1999 | Visser et al. | |
| 6,145,632 A | | 11/2000 | Rutter | |
| 6,360,852 B1 | * | 3/2002 | Sherman, II | F16D 63/004 188/327 |
| 6,422,657 B2 | * | 7/2002 | Di Ponio | 301/105.1 |
| 6,811,003 B2 | * | 11/2004 | Novak | B60B 27/00 188/72.1 |
| 2008/0100127 A1 | | 5/2008 | Yokota | |
| 2011/0215637 A1 | * | 9/2011 | Fakhoury | B23P 11/00 301/105.1 |
| 2012/0247884 A1 | * | 10/2012 | Root | B60B 27/0052 188/18 A |
| 2013/0098697 A1 | * | 4/2013 | Power | B60B 35/04 180/14.1 |
| 2013/0134002 A1 | * | 5/2013 | Schmandt | F16D 51/48 188/70 R |
| 2014/0319900 A1 | * | 10/2014 | Bowyer | B60T 1/06 301/6.1 |

OTHER PUBLICATIONS

Webb Wheel Products, Inc., Drum Hub Specification Sheet.
Webb Wheel Products, Inc., Disc Hub Specification Sheet.

* cited by examiner ical, unless the claims expressly state otherwise.
AXLE HUB ASSEMBLY

BACKGROUND OF THE INVENTION

The present invention relates to an axle hub assembly, and in particular to an axle hub assembly that is adaptable for use either disc or drum brakes without requiring additional adaptors or significant reconfiguration of the axle hub assembly.

Axle hub assemblies are used in a wide variety of heavy duty truck and trailer applications. These hub assemblies are typically adapted for use with either disc brake assemblies or drum brake assemblies, but not both. For example, FIG. 1A illustrates a prior art axle hub assembly 10 for use with a disc brake assembly 12. The disc brake assembly 12 includes a disc brake assembly mounting member 14 mounted to a hub member 16 via a plurality of mounting bolts 18. FIG. 1B illustrates an axle hub assembly 20 for use with a drum brake assembly 22. The drum brake assembly 22 includes a brake drum 24 coupled to a hub member 26 via a plurality of lug bolts 28 that also secure a wheel set 30 to the hub member 26.

Heretofore, axle hub assemblies have been adapted for use with either disc brake assemblies or drum brake assemblies, but not both, or have required the use of additional and separate adaptors to reconfigure the axle hub assembly being used.

BRIEF SUMMARY OF THE INVENTION

One aspect of the present invention is to provide an axle assembly comprising an elongated axle body having a first end and a second end, a first axle spindle coupled to the first end of the axle and a second axle spindle coupled to the second end of the axle body, and first and second axle hub assemblies. The first axle hub assembly comprises a first hub housing having an interior space that receives the first axle spindle of the axle assembly therein, the first hub housing including a radially-extending drum brake mounting flange adapted to have a first brake drum assembly mounted thereto, and a disc brake mounting portion separate from the first drum mounting flange and adapted to have a first disc brake assembly mounted thereto, whereby the first brake drum assembly and the first disc brake assembly may alternatively be mounted to the drum brake mounting flange and the disc brake mounting portion of the first hub housing, respectively, and a first bearing assembly rotationally supporting the first hub housing from the first axle spindle. The second axle hub assembly comprises a second hub housing having an interior space that receives the second axle spindle of the axle assembly therein, the second hub housing including a radially-extending drum brake mounting flange adapted to have a second brake drum assembly mounted thereto, and a disc brake mounting portion separate from the second drum brake mounting flange and adapted to have a second disc brake assembly mounted thereto, and a second bearing assembly rotationally supporting the second hub housing from the second axle spindle, whereby the second brake drum assembly and the second disc brake assembly may alternatively be mounted to the brake mounting flange and the disc and the disc brake mounting portion of the second hub housing, respectively.

Another aspect of the present invention is to provide an axle hub assembly that comprises a hub housing having an interior space for receiving a portion of an axle assembly therein, the hub housing including a radially-extending drum brake mounting flange adapted to have a brake drum assembly mounted thereto, and a disc brake mounting portion separate from the drum brake mounting flange and adapted to have a disc brake assembly mounted thereto, and a bearing assembly adapted to rotationally support the hub housing from an axle assembly, whereby the brake drum assembly and the disc brake assembly may alternatively be mounted to the drum brake mounting flange and the disc brake mounting flange, respectively.

The present inventive axle assembly reduces the overall manufacturing costs associated with having to manufacture separate hub assemblies for separate use with disc brake assemblies and drum brake assemblies, can be easily and quickly assembled, is efficient in use by eliminating the necessity of stocking and installing separate hub assemblies for use with disc and drum brake assemblies, is economical to manufacture and reduces manufacturing costs related to having to manufacture separate disc and drum brake mounting assemblies, is capable of a long operating life, and is particularly well adapted for the proposed use.

These and other advantages of the present invention will be further understood and appreciated by those skilled in the art by reference to the following specification, claims, and appended drawings.

DETAILED DESCRIPTION OF THE PREFERRED EMBODIMENTS

Figure 1A:
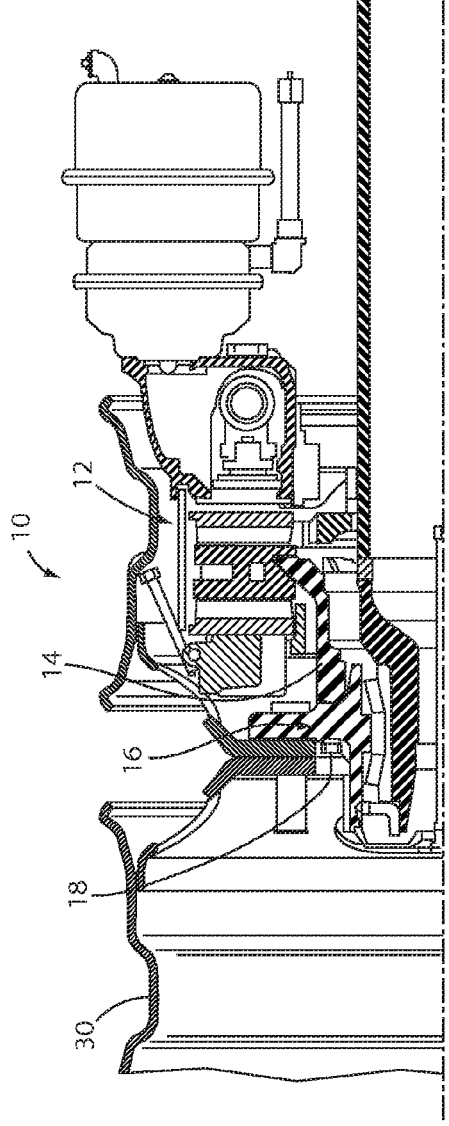
FIG. 1A is a cross-sectional view of prior art axle hub assembly, including an axle hub assembly for use with a disc brake assembly.
Figure 1B:
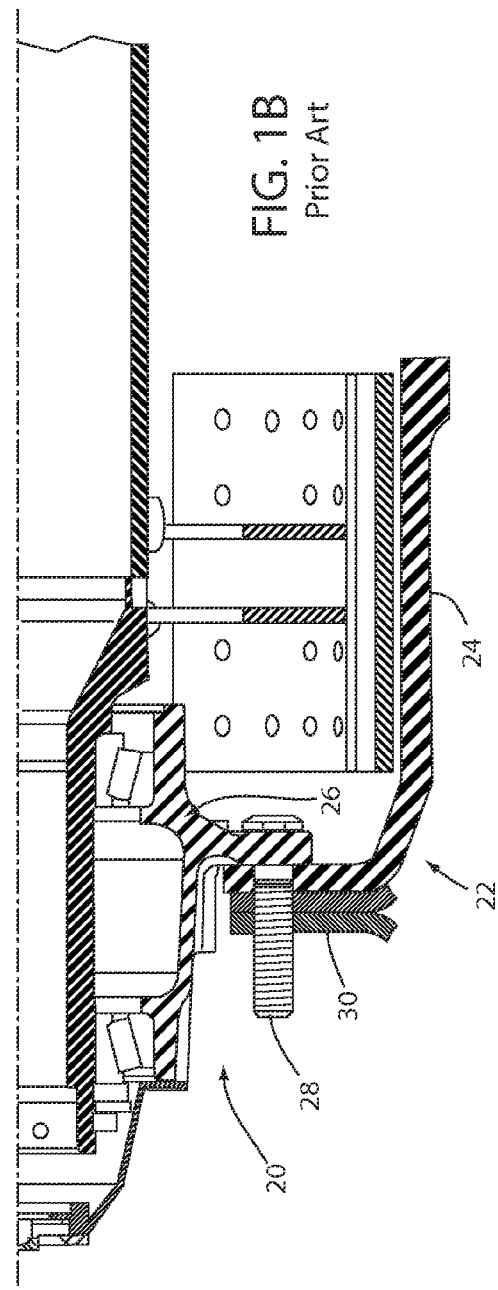
FIG. 1B is a cross-sectional view of prior art axle hub assembly, including an axle hub assembly for use with a drum brake assembly.
Figure 2:
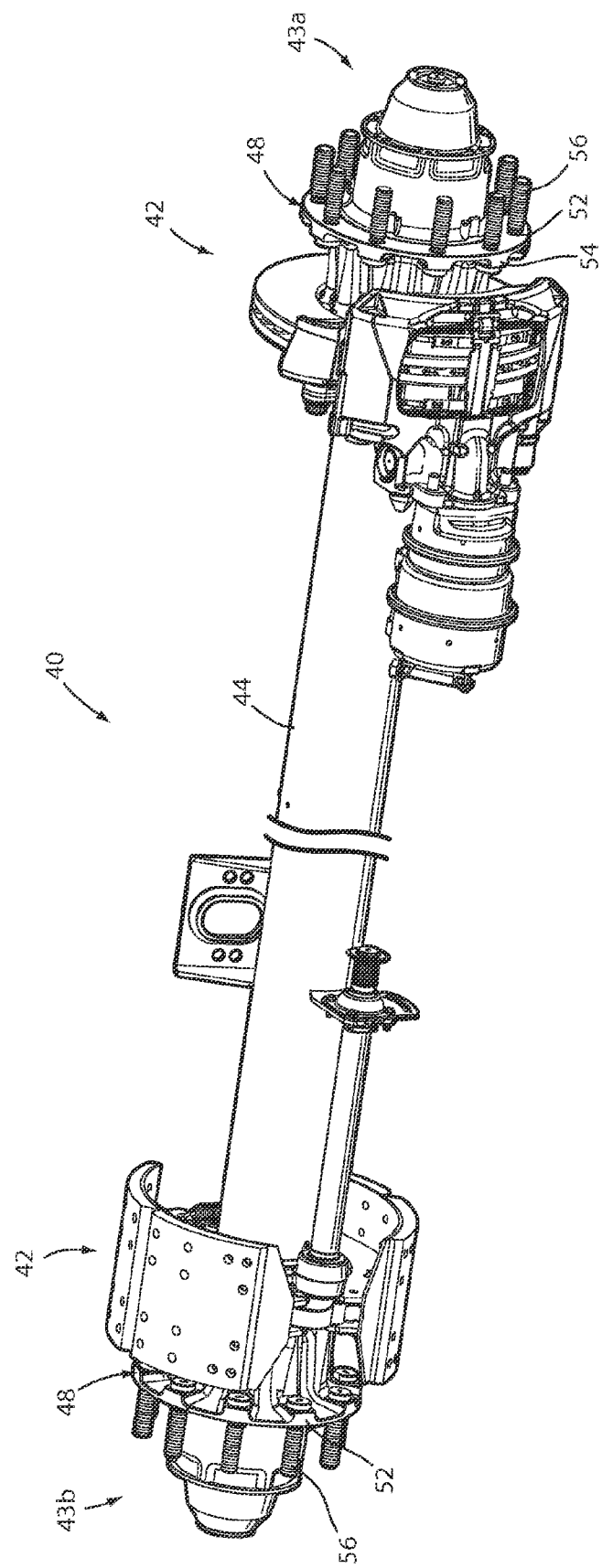
FIG. 2 is a perspective view of an axle assembly that includes a disc brake assembly configuration illustrated at a first end of the axle assembly, and a drum brake assembly configuration illustrated at the opposite end of the axle assembly.
Figure 3:
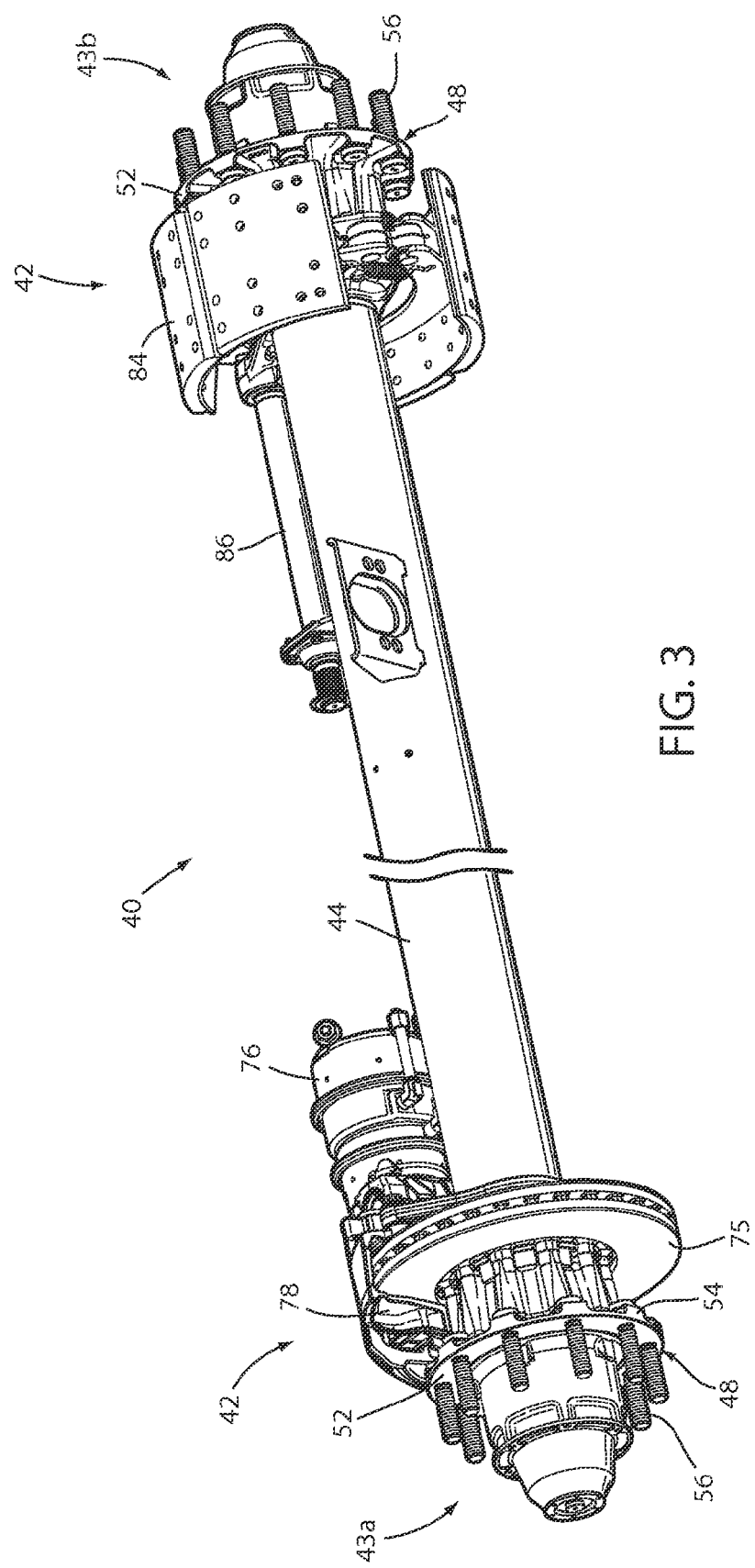
FIG. 3 is a perspective view of the axle assembly with the disc brake assembly configuration shown at a first end of the axle assembly, and the drum brake assembly configuration shown at the opposite end of the axle assembly.
Figure 4:
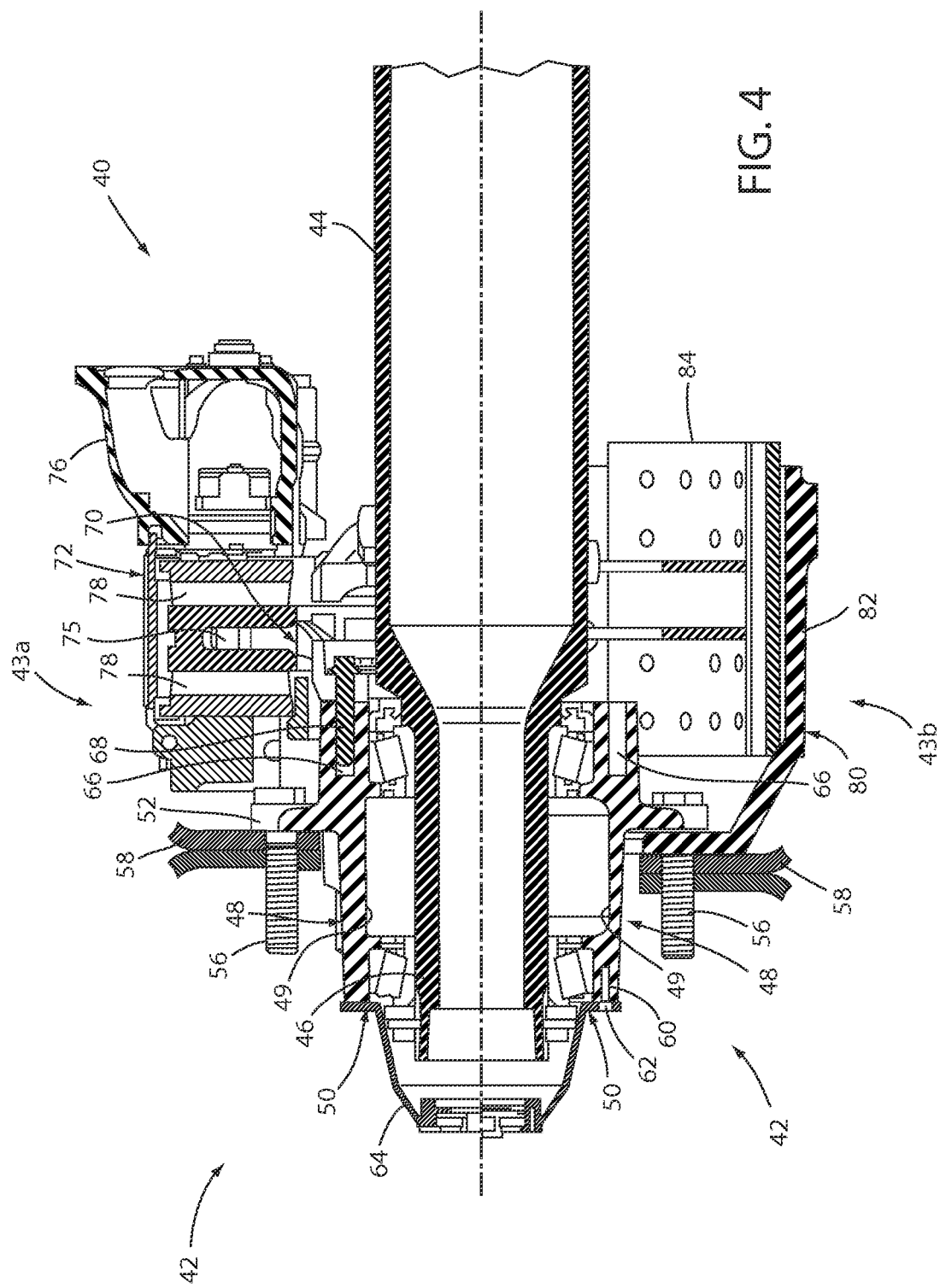
FIG. 4 is a cross-sectional view of the axle assembly, wherein the disc brake assembly configuration is illustrated in the top portion of FIG. 4, and the drum brake assembly configuration is illustrated in the bottom portion of FIG. 4.

For purposes of description herein, the terms "upper," "lower," "right," "left," "rear," "front," "vertical," "horizontal," and derivatives thereof shall relate to the invention as oriented in FIGS. 2-4. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 40 (FIGS. 2-4) generally designates an axle assembly that includes an axle hub assembly 42 embodying the present invention. In the illustrated example, the axle hub assembly 42 is reconfigurable between a disc brake assembly configuration 43a and a drum brake assembly configuration 43b, as described below. It is noted that while the axle assembly 40 is illustrated as including the disc brake assembly configuration 43a and the drum brake assembly 43b at opposite ends thereof, the axle assembly 40 would typically include disc brake assemblies 43a at both ends, or drum brake assemblies 43b at both ends.

The axle assembly 40 includes an elongated axle body 44 and a pair of axle spindles 46 located at the opposite ends thereof, wherein the axle spindles 46 each have a reduced diameter as compared to the axle body 44. The axle hub assemblies 42 are supported by the axle spindles 46, such that the axle spindles 46 extend into an interior space 49 of the axle hub housing 48. Each axle hub housing 48 is rotationally supported on the associated axle spindle 46 by a bearing assembly 50. Each axle hub housing 48 includes a radially-extending mounting flange 52 extending about the periphery of the axle hub housing 48 and including a plurality of lug bolt mounting apertures 54 spaced thereabout and receiving corresponding lug bolts 56 therein. The lug bolts 56 are used to secure wheels of a wheel set 58 to the axle assembly 40.

FIG. 4 shows the disc brake assembly 43a in the top thereof and the drum brake assembly 43b to illustrate the adaptability of the reconfigurable axle assembly 40, and specifically how the assembly is adapted to support both a disc brake arrangement and a drum brake arrangement. Each axle hub housing 48 further includes a plurality of radially spaced, axially-extending, outwardly-opening bolt holes 60 that receive corresponding bolts or screws 62 therein for securing an associated axle hub cap 64 to the end of the axle assembly 40. Each axle hub housing 48 further includes a plurality of radially spaced, axially-extending, inwardly-opening threaded bolt holes 66 for receiving corresponding bolts 68 therein that secure a disc brake rotor 70 to the axle hub housing 48, as described below. In the illustrated example, a disc brake assembly 72 includes the disc brake rotor 70 fixedly coupled to a brake disc 75, and a brake chamber or actuator 76 operably coupled to a pair of brake pads 78, such that the brake chamber 76 actuates the brake pads 78 between a braking position, wherein the brake pads 78 impinge upon the brake disc 75, and a non-braking position, wherein the brake disc 75 is free to rotate. The bolts 68 secure the disc brake rotor 70 directly to the associated axle hub housing 48 without requiring the use of separate adaptors.

A drum brake assembly 80 includes a brake drum 82 coupled to the axle hub housing 48 by the plurality of lug bolts 56. Each brake drum assembly 80 further includes a plurality of brake shoes 84 operably coupled to a brake actuator 86 for moving the brake shoes 84 between a braking position, wherein the brake shoes 84 contact and impinge upon the brake drum 82, and a non-braking position, wherein the brake shoes 84 are spaced from the brake drum 82, thereby allowing the brake drum 82 to freely rotate.

The present inventive axle assembly provides an axle hub assembly that is adapted for use with both disc brakes and drum brakes without the use of separate adaptors and without requiring significant reconfiguration. The axle assembly further reduces the overall manufacturing costs associated with having to manufacture separate hub assemblies for separate use with disc brake assemblies and drum brake assemblies, can be easily and quickly assembled, is efficient in use by eliminating the necessity of stocking and installing separate hub assemblies for use with disc and drum brake assemblies, is economical to manufacture and reduces manufacturing costs related to having to manufacture separate disc and drum brake mounting assemblies, is capable of a long operating life, and is particularly well adapted for the proposed use.

In the foregoing description, it will be readily appreciated by those skilled in the art that modifications may be made to the invention without departing from the concepts as disclosed herein. Such modifications are to be considered as included in the following claims, unless these claims by their language expressly state otherwise.

The invention claimed is as follows:

1. An axle assembly, comprising:
an elongated axle body having a first end and a second end;
a first axle spindle coupled to the first end of the axle and a second axle spindle coupled to the second end of the axle body;
a first axle hub assembly, comprising:
a first hub housing having an interior space that receives the first axle spindle of the axle assembly therein, the first hub housing including a radially extending drum brake mounting flange adapted to have a first brake drum assembly mounted thereto, and a disc brake mounting portion separate from the first drum mounting flange and adapted to have a first disc brake assembly mounted thereto; and
a first bearing assembly rotationally supporting the first hub housing from the first axle spindle, whereby the first brake drum assembly may be mounted to the drum brake mounting flange or the first disc brake assembly may be mounted to the disc brake mounting portion of the first hub housing; and
a second axle hub assembly, comprising:
a second hub housing having an interior space that receives the second axle spindle of the axle assembly therein, the second hub housing including a radially extending drum brake mounting flange adapted to have a second brake drum assembly mounted thereto, and a disc brake mounting portion separate from the second drum brake mounting flange and adapted to have a second disc brake assembly mounted thereto; and
a second bearing assembly rotationally supporting the second hub housing from the second axle spindle, whereby the second brake drum assembly may be mounted to the drum brake mounting flange or the second disc brake assembly may be mounted to the disc brake mounting portion of the second hub housing.

2. The axle assembly of claim 1, wherein the first hub housing and the second hub housing each comprise a single, integral piece.

3. The axle assembly of claim 2, wherein the drum brake mounting flanges of the first and second hub housings are each adapted to have a wheel set mounted thereto.

4. The axle assembly of claim 3, wherein the disc brake mounting portions of the first and second hub housings each include a recess for receiving a mechanical fastener therein.

5. The axle assembly of claim 4, wherein the disc brake mounting portions of the first and second hub housings each include a threaded bolt hole.

6. The axle assembly of claim 5, wherein the bolt holes each extend axially.

7. The axle assembly of claim 1, wherein the drum brake mounting flanges of the first and second hub housings are each adapted to have a wheel set mounted thereto.

8. The axle assembly of claim 1, wherein the disc brake mounting portions of the first and second hub housings each include a recess for receiving a mechanical fastener therein.

9. The axle assembly of claim 8, wherein the disc brake mounting portions of the first and second hub housings each include a threaded bolt hole.

10. The axle assembly of claim 9, wherein the bolt holes each extend axially.

11. An axle hub assembly, comprising:
a hub housing having an interior space for receiving a portion of an axle assembly therein, the hub housing including a radially extending drum brake mounting flange adapted to have a brake drum assembly mounted thereto, and a disc brake mounting portion separate from the drum brake mounting flange and adapted to have a disc brake assembly mounted thereto; and
a bearing assembly adapted to rotationally support the hub housing from an axle assembly;
whereby the brake drum assembly may be mounted to the drum brake mounting flange or the disc brake assembly may be mounted to the disc brake mounting flange.

12. The axle hub assembly of claim 11, wherein the hub housing comprises a single, integral piece.

13. The axle hub assembly of claim 12, wherein the drum brake mounting flange is adapted to have a wheel set mounted thereto.

14. The axle hub assembly of claim 13, wherein the disc brake mounting portion includes a recess for receiving a mechanical fastener therein.

15. The axle hub assembly of claim 14, wherein the disc brake mounting portion includes a threaded bolt hole.

16. The axle hub assembly of claim 15, wherein the bolt hole extends axially.

17. The axle hub assembly of claim 11, wherein the drum brake mounting flange is adapted to have a wheel set mounted thereto.

18. The axle hub assembly of claim 11, wherein the disc brake mounting portion includes a recess for receiving a mechanical fastener therein.

19. The axle hub assembly of claim 18, wherein the disc brake mounting portion includes a threaded bolt hole.

20. The axle hub assembly of claim 19, wherein the bolt hole extends axially.

* * * * *